United States Patent [19]

Edmisson

[11] Patent Number: 4,719,862
[45] Date of Patent: Jan. 19, 1988

[54] BLADE SHANK ASSEMBLY USED IN A FERTILIZER APPLICATOR ASSEMBLY

[75] Inventor: Delmar D. Edmisson, Guymon, Okla.

[73] Assignee: Adams Hard-Facing Company, Inc., Guymon, Okla.

[21] Appl. No.: 881,734

[22] Filed: Jul. 3, 1986

Related U.S. Application Data

[63] Continuation-in-part of Ser. No. 699,169, Feb. 7, 1985, Pat. No. 4,628,839.

[51] Int. Cl.⁴ ............................................. A01C 23/02
[52] U.S. Cl. ........................................ 111/7; 172/699; 172/719
[58] Field of Search ............... 111/7, 6; 172/699, 719, 172/753, 764, 713, 700, 727, 728

[56] References Cited

U.S. PATENT DOCUMENTS

| | | | |
|---|---|---|---|
| 2,684,617 | 7/1954 | Johnston | 111/7 |
| 3,092,052 | 6/1963 | Anderson | 111/7 |
| 3,259,087 | 7/1966 | Horton | 111/7 |
| 4,132,181 | 1/1979 | Smith | 111/7 |
| 4,201,142 | 5/1980 | Stump | 172/699 |
| 4,355,589 | 10/1982 | Wetmore | 111/7 |

*Primary Examiner*—Richard J. Johnson
*Attorney, Agent, or Firm*—Laney, Dougherty, Hessin & Beavers

[57] ABSTRACT

A blade shank assembly useful in an applicator for delivering liquid or gaseous fertilizer to a subsoil location, the blade shank assembly including an elongated curved shank plate, a generally V-shaped insert secured to the blade shank at the leading edge thereof and adjacent the forward lower point of the blade shank. The insert is constructed of hard metal and is configured to afford maximum protection to the blade shank plate, and extended service life to the assembly.

2 Claims, 10 Drawing Figures

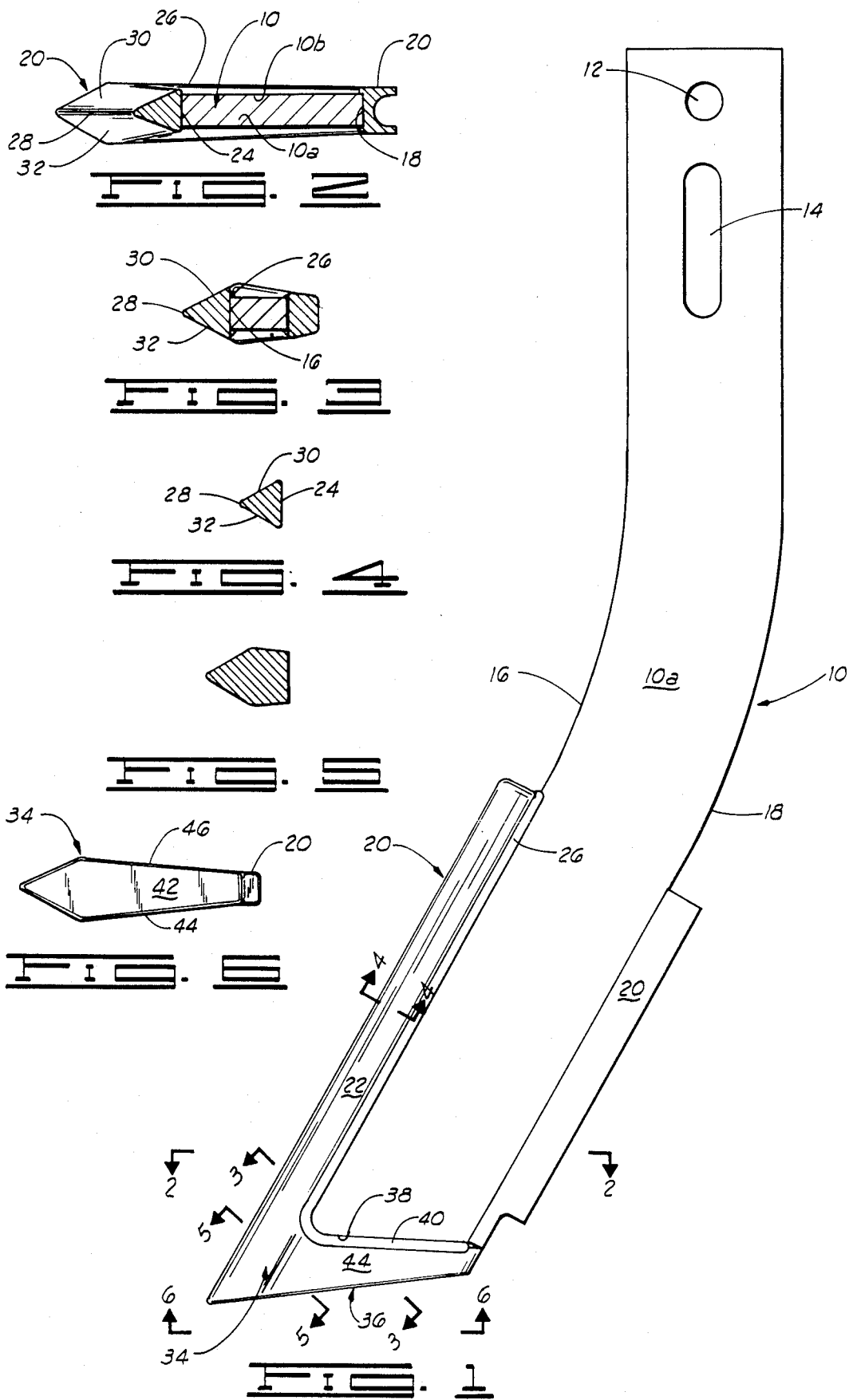

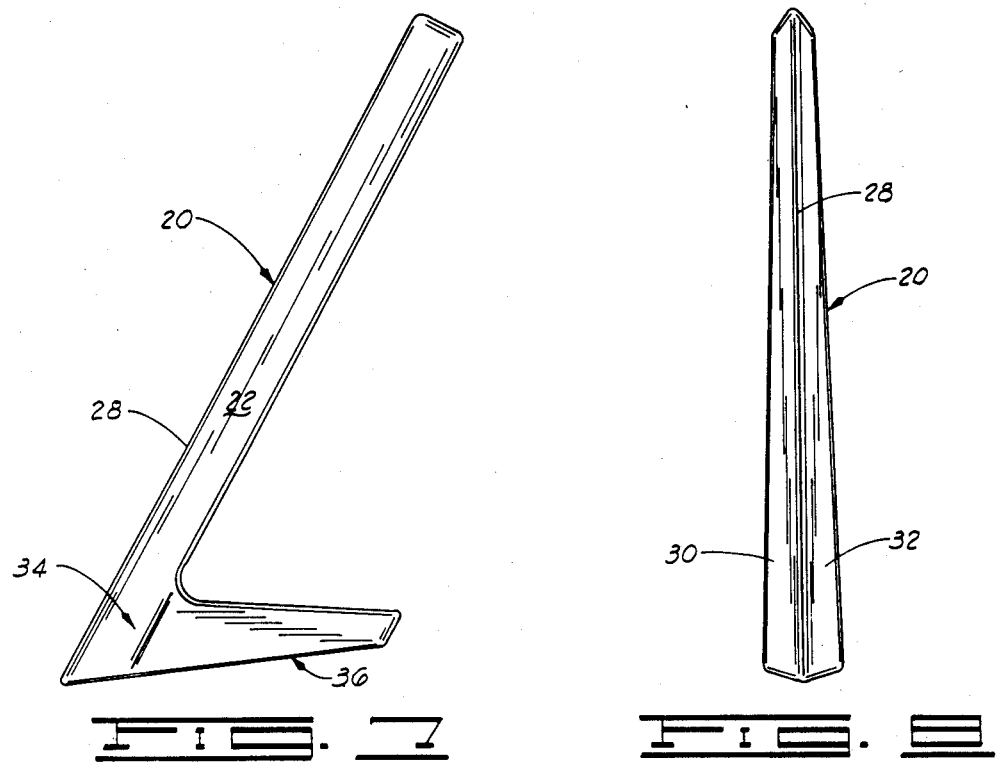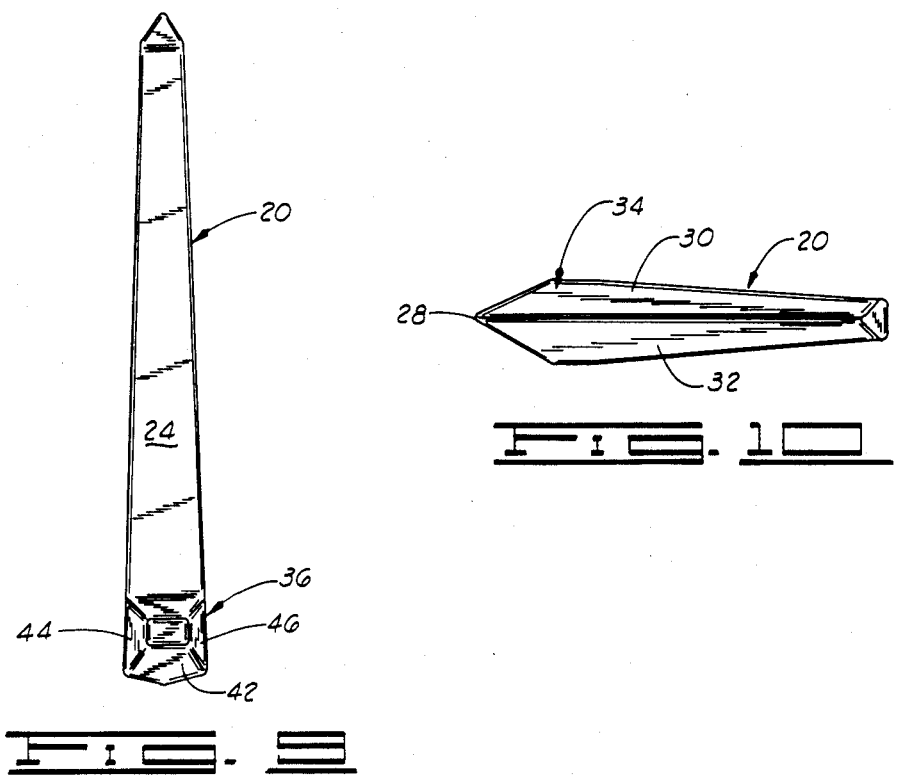

BLADE SHANK ASSEMBLY USED IN A FERTILIZER APPLICATOR ASSEMBLY

BACKGROUND OF THE INVENTION

1. Field of the Invention

This invention relates to agricultural implements used to apply fertilizer to a subsoil location, and more particularly, to an applicator knife for placing a fluid fertilizer, such as anhydrous ammonia, in a burrow or trench as it is formed by transition of the knife blade through the soil. More specifically, the invention relates to a protective hard metal insert which is secured to the shank of the fertilizer knife or blade in order to form a portion of the leading edge thereof. The insert is espeically shaped and fabricated to provide an effective cutting action where stalks, stubble and trash are to be traversed by the fertilizer applicator knife blade during use.

2. Brief Description of the Prior Art

An applicator knife blade employed for depositing or placing anhydrous ammonia in the soil includes a curved shank plate having a pointed lower end which carries at its rear side, an elongated fertilizer tube through which the anhydrous ammonia is caused to flow don the back side of the shank blade to a point of discharge where the fertilizer is discharged into a trench formed by the blade. Typically, the knife blade shank will carry at its leading edge, a protective hard metal insert element which is welded to the leading edge of the shank blade and is configured so as to provide a relatively sharp edge capable of cutting through the soil. The hard metal insert functions to protect the leading side of the shank blade against abrasive wear and deleterious impact with rocks or other abrasive elements in the soil.

In U.S. Pat. No. 4,355,589 assigned to the assignee of the present application, one type of fertilizer applicator knife assembly is illustrated. This fertilizer applicator knife assembly carries a wear insert at the leading side of the knife's shank blade. The insert is made of a very hard, abrasion-resistant metal, such as chromium carbide. It is beveled or tapered to a relatively narrow edge at its front or leading edge so as to provide a cutting action as the knife assembly is forced through the soil during application of the fertilizer.

An improved form of fertilizer applicator knife assembly is shown in my co-pending application Ser. No. 699,169 of which the present application is a continuation-in-part.

Other types of hard metal inserts for similar usage at the leading side of a fertilizer applicator knife blade are illustrated in Smith et al U.S. Pat. No. 4,132,181; Stump U.S. Pat. No. 4,201,402; Williams U.S. Pat. No. 4,033,721; Horton U.S. Pat. No. 3,259,087; and Johnston U.S. Pat. No. 2,684,617.

BRIEF DESCRIPTION OF THE PRESENT INVENTION

The present invention comprises a fertilizer applicator knife assembly which includes a curved blade shank plate having a concave leading edge to which is mounted, preferably by welding, a protective wear insert of hardened metal and special configuration. The shape of the insert is such that it is of improved efficiency in parting the soil at the lower leading end of the assembly, and affords greatly enhanced protection for the shank blade plate, so that the service life of the fertilizer distribution implement upon which are carried the shank and insert attached thereto is greatly extended.

The insert provided includes a verticlaly extending shank which is of increasing transverse thickness from its upper end to a head portion provided at its lower end. The insert also has a heel or sole portion which sweeps back and slightly upwardly from the head portion, and also diminishes in thickness from the head portion to the rearmost point on the sole. The shank of the insert bears against the leading side or edge of the shank plate to which the insert is mounted, and the heel is welded or otherwise suitably secured to the lower side of the shank plate.

The head of the wear insert is the broadest part of the insert, thereby allowing a wider zone of soil to be fractured into which liquid or gaseous fertilizer can be applied.

An important object of this invention is to provide an insert for the applicator knife assembly which, by reason of its geometric configuration, tends to become sharper over extended periods of usage, and thus to become enhanced in its cutting effectiveness.

A further object of the invention is to provide a specially shaped hard metal wear insert for securement to the leading edge of a knife blade of a fertilizer applicator knife assembly. The wear insert thus provided is configured to provide a highly effective cutting action, allowing the applicator knife assembly to cut through stalks, stubble and trash accumulated on the surface of the ground, and for a short depth therebelow, while forming a widened trench to receive anhydrous ammonia fertilizer applied to a depth in the ground by means of the applicator knife assembly.

An additional object of the present invention is to provide an improved fertilizer applicator knife assembly which offers an extended and relatively longer service life than similar fertilizer applicator knife assemblies.

FIG. 1 is a side elevation view of a blade shank assembly constructed in accordance with the present invention.

FIG. 2 is a sectional view taken along line 2—2 on FIG. 1.

FIG. 3 is a sectional view taken along line 3—3 on FIG. 1.

FIG. 4 is a sectional view taken along line 4—4 on FIG. 1.

FIG. 5 is a sectional view taken along line 5—5 on FIG. 1.

FIG. 6 is a bottom plan view of the blade shank assembly of the invention.

FIG. 7 is a side elevation view of the protective hard metal insert forming a part of the present invention.

FIG. 8 is a front elevation view of the protective hard metal insert.

FIG. 9 is a rear elevation view of the protective insert.

FIG. 10 is a plan view of the protective hard metal insert.

DETAILED DESCRIPTION OF THE PREFERRED EMBODIMENT OF THE INVENTION

Referring initially to FIG. 1 of the drawing, an elongated shank plate is designated generally by reference numeral 10. The shank plate 10 has opposed, parallel side surfaces 10a and 10b, and has pair of holes 12 and 14 at the upper end thereof to facilitate securement of the shank plate to the frame of an agricultural implement adapted to support one or more drums or other containers of a liquid or gaseous fertilizer material to be dispensed into the earth in a conventional fashion. The shank plate 10 includes a generally concave forward or leading edge 16 and a generally convex rear or trailing edge 18. Adjacent the lower end of the rear or trailing edge 18 of the shank plate, a spacer block 20 is secured thereto for the purpose of spacing a fertilizer dispensing tube (not shown) away from the trailing edge of the shank plate for reasons well understood in the art. Other forms of spacers can be utilized, and in some instances no spacers are required.

Secured to the concave forward edge 16 of the shank plate 10 is a generally L-shaped, or check-shaped, protective hard metal insert, designated generally by reference numeral 20. The insert 20 includes an elongated shank 22 which is generally triangular in cross-sectional configuration. The shank 22 includes a flat, transversely extending rear side 24 which is secured by weld metal 26 to the flat forward edge 16 of the shank plate 10. It will be noted in referring to FIGS. 2 and 3, that the rear side 24 of the protective insert 20 is of greater width than is the flat forward edge 16 of the shank plate 10. It thus overhangs, and, as will be subsequently explained, protects, the forward or leading edge 16 of the shank plate 10 and also the opposite parallel side surfaces 10a and 10b of the shank plate. The protective hard metal insert 20 further includes a leading edge 28 which is formed by the convergence of a pair of opposed side surfaces 30 and 32.

At its forward lower end, the protective hard metal insert 20 includes an enlarged pointed head portion, designated generally by reference numeral 34. As will be perceived in referring to FIGS. 5, 6, and 8-10 the location where the insert 20 is of its greatest transverse width or thickness is at the head portion 34. The head potion 34 is located at the intersection between the shank portion 22 and a sole or bottom plate portion, designated generally by reference numeral 36. The sole 36 of the insert 20 extends rearwardly along the lower side 38 of the shank plate 10, and has its upper side welded to the lower edge of the shank plate, as shown in FIG. 1, by a bead of weld metal 40. It will also be noticed in referring to FIG. 1 that the sole 36 of the protective insert 20 projects rearwardly beneath the shank plate 10 to a point where the lower end of the spacer block 20 is protectively covered by the rear edge portion of the sole 36. As shown in FIGS. 6 and 8, the sole 36 includes a flat bottom surface 42 and a pair of opposed side surfaces 44 and 46 which converge as they extend in a rearward direction from the head 34.

As the blade shank assembly of the invention is illustrated in FIG. 1, it is shown in the attitude that it assumes at the time that it is attached to a frog or other supporting structure by means of bolts or fastening devices passed through the holes 12 and 14 in the shank plate 10. It will be noted that at this time, the bottom surface of the sole 36 is inclined upwardly and at an accute angle to the horizontal. This angulation should be between about 10° and about 25°.

As will be noted in referring to FIGS. 3, 4, and 7-10, the shank portion 22 of the protective hard metal insert 20 is of increasing transverse thickness from its upper end to the head portion 34 located at the lower end of the shank portion. The sole 36 of the insert, in similar fashion, is of decreasing thickness from the head 34 of the insert to he point of farthest rearward extension of the sole. This decreasing thickness is best illustrated in igures 6 and 8.

Reference to FIG. 5 of the drawings reveals that the head portion 34 has a pentagonal cross-sectional configuration when viewed in section along the line 5—5 taken on FIG. 1. As shown by FIGS. 4 nd 5, at this location (along the section line 5—5) the head portion is about twice as wide (in its transverse dimension) as the shank portion is at the location where the section line 4—4 is taken.

Although a preferred embodiment of the invention has been herein illustrated and described, it will be understood that changes can be made in the illustrated embodiment without departure from the basic principles which underlie the invention. Changes and variations of thiss type are therefore deemed to be circumscribed by the spirit and scope of the invention, except as the same are necessarily limited by the appended claims or reasonable equivalents thereof.

What is claimed is:

1. A fertilizer applicator knife assembly comprising:
   a curved blade shank plate having a concave leading edge of substantially uniform thickness up and down its length and a convex trailing edge, an upper end and a lower end, and further having a pair of parallel side surfaces extending between the concave leading edge and the concave trailing edge;
   a generally L-shaped protective hard metal wear insert secured to the concave leading edge of the blade shank plate, said L-shaped protective wear insert including:
   an elongated, shank portion extending downwardly along the concave leading edge of the shank plate and being of increasing transverse thickness from its upper end to its lower end, said shank portion having a leading edge and having a pair of side surfaces converging to said leading edge, and having a rear side extending between said side surfaces, said rear side of the shank portion of the insert having a width which is greater than the width of the leading edge of said shank plate throughout the entire distance of contact of said wear metal insert with said leading edge of said shank portion whereby space adjacent the parallel side surfaces of said shank is defined by the overhang of the rear side surface of said elongated, shank portion of said hard metal wear insert for the accumulation and retention in said defined space of a protective layer of caked soil;
   an enlarged, pointed head portion at the forward lower end of said shank portion, and constituting that portion of said insert having the greatest transverse width, said head portion having a width which is at least twice the narrowest transverse dimension of the shank portion of said insert; and
   an elongated bottom sole extending rearwardly from the head portion along the lower side of the shank plate and decreasing in transverse thickness from a location adjacent said head portion toward the rear end thereof, said bottom sole having a transverse thickness greater than the transverse thickness of said shank plate as measured between said parallel side surfaces and therefore providing an overhang which defines the protective soil layer retaining-space commonly defined by the cooperation of the overhanging bottom and the overhanging rear side of the shank portion of the wear insert.

2. A fertilizer applicator knife assembly comprising:

a curved blade shank plate having a concave leading edge of substantially uniform thickness up and down its length, and a convex trailing edge, an upper end and a lower end, and further having a pair of parallel side surfaces extending between the concave leading edge and the convex trailing edge;

a fertilizer dispensing tube spacer block secured to the convex trailing edge of said blade shank, and having a transverse width greater than the width of the blade shank, said spacer block further having a concavity formed at the rear side thereof opposite the side in contact with, and secured to, the blade shank for receiving and protecting an elongated fertilizer dispensing tube extended along said spacer block in said concavity to the lower portion of said blade shank assembly;

a generally L-shaped protective hard metal wear insert secured to the concave leading edge of the blade shank plate, said L-shaped protective wear insert including:

an elongated, shank portion extending downwardly along the concave leading edge of the shank plate and being of increasing transverse thickness from its upper end to its lower end, said shank portion having a leading edge and having a pair of side surfaces converging to said leading edge, and having a rear side extending between said side surfaces, said rear side having a width which is greater than the width of the leading edge of said shank plate throughout the entire distance of contact of said wear metal insert with said leading edge of said shank plate whereby a bounded space adjacent the parallel side surfaces of said shank plate is defined by the overhang of the rear side surface of said elongated, shank portion of said hard metal wear insert for the accumulation and retention in said bounded space of a protective layer of caked soil;

an enlarged pointed head portion at the forward lower edge of said shank portion, and constituting that portion of said insert having the greatest transverse width; and an elongated bottom sole extending rearwardly from the head portion along the lower side of the shank plate and decreasing in transverse thickness from a location adjacent said head portion toward the rear end thereof, said bottom sole having a transverse thickness at the rearmost portion thereof which is at least as wide as the transverse width of the lowermost end portion of said spacer block, and immediately contiguous to the lowermost end portion of said spacer block, whereby said spacer block and the tube carried therein are protected from abrasive contact by soil moving past the lower end of the spacer block as the blade shank assembly is moved through the soil.

* * * * *